(12) United States Patent
Lee et al.

(10) Patent No.: US 10,104,728 B2
(45) Date of Patent: Oct. 16, 2018

(54) LED DRIVING CIRCUIT, LED DEVICE COMPRISING THE SAME, AND DRIVING METHOD OF LED

(71) Applicant: FAIRCHILD KOREA SEMICONDUCTOR LTD., Bucheon (KR)

(72) Inventors: Minwoo Lee, Bucheon (KR); Moonsik Song, Bucheon (KR); Seunguk Yang, Anyang (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/380,254

(22) Filed: Dec. 15, 2016

(65) Prior Publication Data

US 2017/0181236 A1 Jun. 22, 2017

Related U.S. Application Data

(60) Provisional application No. 62/269,333, filed on Dec. 18, 2015.

(51) Int. Cl.
*H05B 37/02* (2006.01)
*H05B 33/08* (2006.01)

(52) U.S. Cl.
CPC ....... *H05B 33/0815* (2013.01); *H05B 33/083* (2013.01); *H05B 33/0845* (2013.01)

(58) Field of Classification Search
CPC ............ H05B 33/0815; H05B 33/0824; H05B 33/0845
USPC .................................................. 315/186, 297
See application file for complete search history.

(56) References Cited

U.S. PATENT DOCUMENTS

| | | | | |
|---|---|---|---|---|
| 7,550,934 B1* | 6/2009 | Deng | ................. | H05B 33/0887 |
| | | | | 315/209 R |
| 8,723,437 B1* | 5/2014 | Wang | ................. | H05B 33/0848 |
| | | | | 315/224 |
| 2009/0184662 A1* | 7/2009 | Given | ................ | H05B 33/0815 |
| | | | | 315/294 |
| 2015/0156836 A1* | 6/2015 | Han | ................... | H05B 33/0812 |
| | | | | 315/186 |
| 2016/0286617 A1* | 9/2016 | Takahashi | .......... | H05B 33/0818 |

* cited by examiner

*Primary Examiner* — Tung X Le (74) *Attorney, Agent, or Firm* — AMPACC Law Group, PLLC (57) ABSTRACT

A light emitting diode (LED) driving circuit disclosed herein controls a switching operation of a power switch connected to an LED string and includes a reference voltage generator configured to generate a frequency modulation reference voltage according to a dimming signal that controls brightness of the LED string, and a switching controller configured to control a switching frequency of the power switch to be constant when a level of the dimming signal is higher than that of the frequency modulation reference voltage, and control the switching frequency of the power switch based on the dimming signal when a level of the dimming signal is lower than that of the frequency modulation reference voltage.

20 Claims, 4 Drawing Sheets

LED DRIVING CIRCUIT, LED DEVICE COMPRISING THE SAME, AND DRIVING METHOD OF LED

CROSS-REFERENCE TO RELATED APPLICATION

This application claims priority to and the benefit of U.S. Patent Application No. 62/269,333 filed in the USPTO on Dec. 18, 2016, the entire contents of which are incorporated herein by reference.

BACKGROUND (a) Technical Field

Embodiments relate to a light emitting diode (LED) driving circuit, an LED device including the same, and an LED driving method.

(b) Description of the Related Art

A reference voltage may be generated according to a dimming signal for adjusting brightness of an LED string. The reference voltage is a voltage for controlling a current flowing at the LED string, and may have an upper limit reference and a lower limit reference based on the dimming signal.

For example, the upper limit reference may be set to a level higher by a predetermined margin based on a level of the dimming signal, and the lower limit reference may be set to a level lower by a predetermined margin based thereon.

When the brightness of the LED string is controlled below a predetermined ratio with respect to maximum brightness thereof by means of the dimming signal, the upper limit reference does not reach a zero voltage even through the lower limit reference reaches the zero voltage. Thus, there occurs a problem in that it is difficult to control the brightness of the LED string below the predetermined ratio according to the dimming signal.

SUMMARY

An object of the present disclosure is to provide a light emitting diode (LED) driving circuit, an LED device including the same, and an LED driving method, which are capable of precisely controlling brightness of an LED string.

In accordance with one aspect of the present disclosure, an LED driving circuit controls a switching operation of a power switch connected to an LED string. The LED driving circuit includes a reference voltage generator configured to generate a frequency modulation reference voltage according to a dimming signal that controls brightness of the LED string, and a switching controller configured to control a switching frequency of the power switch to be constant when a level of the dimming signal is higher than that of the frequency modulation reference voltage, and control the switching frequency of the power switch based on the dimming signal when a level of the dimming signal is lower than that of the frequency modulation reference voltage.

The switching controller may generate a compensation dimming signal so as to control a delay period according to the dimming signal, and control a turn-on time of the power switch on the basis of a comparison result between a level of the compensation dimming signal and that of the frequency modulation reference voltage when a level of the dimming signal is lower than that of the frequency modulation reference voltage.

The reference voltage generator may generate an upper limit reference voltage and a lower limit reference voltage.

The switching controller may generate a modulation control signal on the basis of comparison results between a sensing voltage, which corresponds to a current flowing at the LED string, and each of the upper limit reference voltage and the lower limit reference voltage, and the compensation dimming signal by adding a compensation signal, which is generated according to the modulation control signal, to the dimming signal.

The switching controller may include a first comparator configured to compare the sensing voltage with the upper limit reference voltage, a second comparator configured to compare the sensing voltage with the lower limit reference voltage, and a set-reset (SR) flip-flop configured to generate the modulation control signal according to outputs of the first comparator and the second comparator.

The switching controller may include a delay controller configured to generate the compensation signal, which is being increased during a period from a time at which the sensing voltage reaches the lower limit reference voltage to a time at which the sensing voltage reaches the upper limit reference voltage, according to the modulation control signal, and the compensation dimming signal by adding the compensation signal and the dimming signal.

The delay controller may include a current source, an amplifier including a first input terminal to which the dimming signal is input, a second input terminal, and an output terminal connected to the second input terminal, a first switch connected between the output terminal of the amplifier and a first node, and configured to perform a switching operation according to the modulation control signal, and a capacitor connected between the first node and the output terminal of the amplifier, wherein the compensation dimming signal may depend on a voltage at the first node.

The delay controller may further include a second switch connected between the current source and the first node, and configured to perform a switching operation according to the modulation control signal.

The switching controller may include a comparator configured to compare the compensation dimming signal with the frequency modulation reference voltage, thereby generating a frequency control signal.

The switching controller may include a logical operator configured to perform a logical operation on the frequency control signal and the modulation control signal, thereby generating a gate control signal.

In accordance with another aspect of the present disclosure, a light emitting diode (LED) device may include an LED string, a power switch electrically connected to the LED string and configured to control a current flowing at the LED string, and an LED driving circuit configured to generate a frequency modulation reference voltage according to a dimming signal that controls brightness of the LED string, and a compensation dimming signal so as to control a delay period according to the dimming signal, and control a turn-on time of the power switch on the basis of a comparison result between a level of the compensation dimming signal and that of the frequency modulation reference voltage when a level of the dimming signal is lower than that of the frequency modulation reference voltage.

In accordance with still another aspect of the present disclosure, a light emitting diode (LED) driving method controls a switching operation of a power switch connected to an LED string. The LED driving method includes generating an upper limit reference voltage, a lower limit reference voltage, and a frequency modulation reference voltage according to a dimming signal that controls brightness of the LED string, generating a compensation dimming signal so as to control a delay period according to the dimming signal, and controlling a turn-on time of the power switch on the basis of a comparison result between a level of the compensation dimming signal and that of the frequency modulation reference voltage when a level of the dimming signal is lower than that of the frequency modulation reference voltage.

The LED driving method may further include controlling a turn-off time of the power switch on the basis of a comparison result between a sensing voltage, which corresponds to a current flowing at the LED string, and the upper limit reference voltage.

The generating of the compensation dimming signal may include generating a compensation signal that is being increased during a period from a time at which the sensing voltage, which corresponds to the current flowing at the LED string, reaches the lower limit reference voltage to a time at which the sensing voltage reaches the upper limit reference voltage, and adding the compensation signal to the dimming signal.

In accordance with embodiments, an LED driving circuit, an LED device including the same, and an LED driving method which are capable of precisely controlling brightness of an LED string are provided.

DETAILED DESCRIPTION OF THE EMBODIMENTS

Hereinafter, embodiments of the present disclosure will be fully described in a detail which is suitable for implementation by those skilled in the art with reference to the accompanying drawings. However, the present disclosure may be implemented in various different forms, and thus it is not limited to embodiments to be described herein. Also, in the accompanying drawings, parts not related to the description will be omitted in order to clearly describe the present disclosure, and the similar reference numerals are given to parts having the similar functions throughout the disclosure.

Throughout the disclosure, when parts are disclosed as "connected" to other parts, it should be understood that the parts can be "directly connected" to the other parts as well as can be "electrically connected" thereto by interposing other components therebetween. Also, when a part is described as "comprising" a component, this does not preclude the presence thereof and should be construed as being able to further include other components, unless there is a clearly different meaning in the present application.

Figure 1:
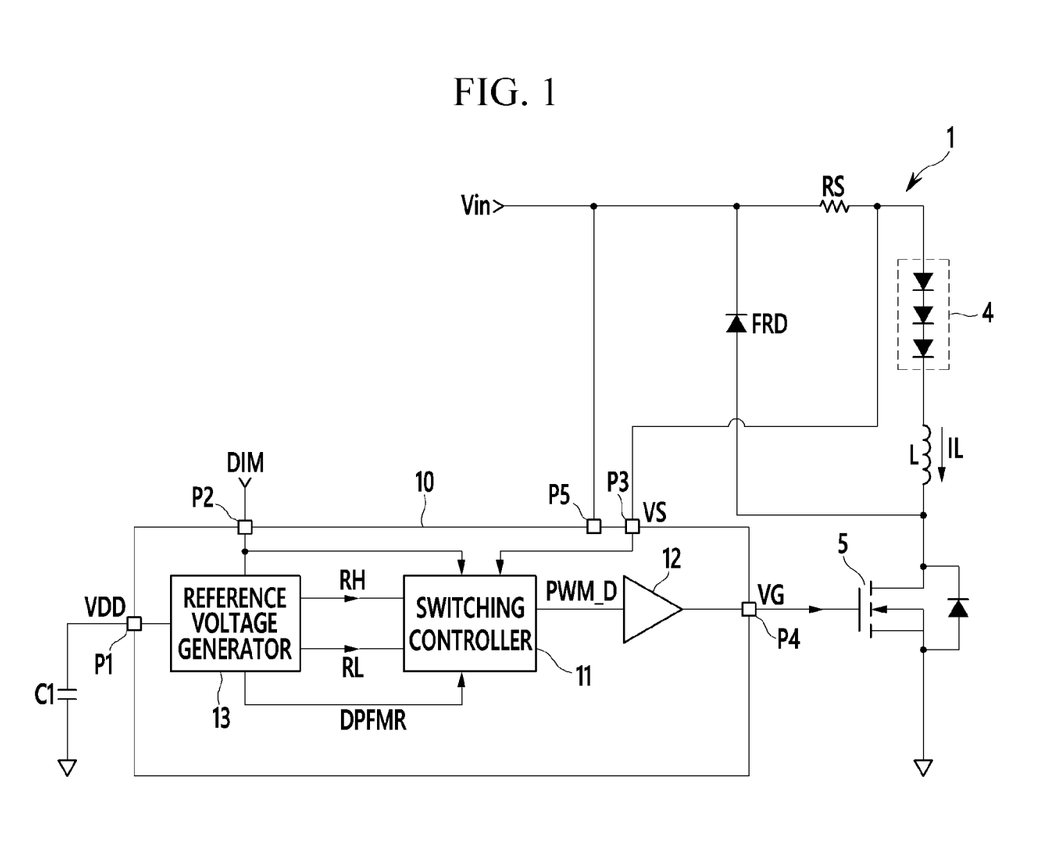
FIG. 1 is a diagram illustrating a light emitting diode (LED) driving circuit and an LED device including the same according to an embodiment of the present disclosure.

FIG. 1 is a diagram illustrating a light emitting diode (LED) driving circuit and an LED device including the same according to an embodiment of the present disclosure.

An LED device 1 includes an LED string 4, a power switch 5, a diode FRD, an inductor L, a sensing resistor RS, and an LED driving circuit 10.

The sensing resistor RS includes one end to which an input voltage Vin is supplied, and the other end connected to the LED string 4. The input voltage Vin may be a direct current (DC) voltage.

The input voltage Vin is supplied to one end of the LED string 4, and the other end thereof is connected to one end of the inductor L. The diode FRD is connected between a drain electrode of the power switch 5 and the one end of the sensing resistor RS. During a period in which the power switch 5 is in an OFF state, the diode FRD may form a current path together with the LED string 4 and the inductor L.

The power switch 5 performs a switching operation according to a gate voltage VG, which is transmitted from the LED driving circuit 10, to control a current flowing at the LED string 4. The power switch 5 is implemented with an n-channel metal oxide semiconductor field effect transistor (NMOSFET). The present disclosure is not limited thereto, and another type transistor element may be employed as necessary.

The drain electrode of the power switch 5 is connected to the other end of the inductor L, and a source electrode of the power switch 5 is connected to a ground. The gate voltage VG transmitted from the LED driving circuit 10 is input to a gate electrode of the power switch 5. The power switch 5 is switched by the gate voltage VG.

When the power switch 5 is turned on, an inductor current IL, which is increased according to the input voltage Vin, flows through the LED string 4 and the power switch 5, and energy is stored in the inductor L by means of the inductor current IL.

When the power switch 5 is turned off, the inductor current IL is decreased during a period in which the energy exists, wherein the energy was stored in the inductor L during a period in which the power switch 5 was turned on. At this point, the inductor current IL, which is being decreased, flows to the LED string 4 through the diode FRD.

The inductor current IL is the same as an LED current flowing at the LED string 4, the inductor current IL flows through the sensing resistor RS, and a voltage VS, which is obtained by subtracting a voltage drop IL*RS at the sensing resistor RS from the input voltage Vin, is input to the LED driving circuit 10 through a pin P3.

The LED driving circuit 10 generates a high limit reference voltage RH and a low limit reference voltage RL according to a dimming signal DIM. The dimming signal DIM is a signal for controlling a dimming of the LED device 1, and may be supplied from the outside of the LED device 1. The LED driving circuit 10 may generate a compensation dimming signal DIMS for reducing a switching frequency of the power switch 5 according to a decrease of the dimming signal DIM.

When a level of the dimming signal DIM is higher than that of a frequency modulation reference voltage DPFMR, the LED driving circuit 10 generates the gate voltage VG on the basis of comparison results between a sensing voltage VSENSE and each of the high limit reference voltage RH and the low limit reference voltage RL. When the level of the dimming signal DIM is lower than that of the frequency modulation reference voltage DPFMR, the LED driving circuit 10 may generate the gate voltage VG on the basis of the comparison results between the sensing voltage VSENSE and each of the high limit reference voltage RH and the low limit reference voltage RL, and a comparison result between a level of the compensation dimming signal DIMS and that of the frequency modulation reference voltage DPFMR.

As shown in FIG. 1, the LED driving circuit 10 includes a reference voltage generator 13, a switching controller 11, and a gate driving circuit 12. A configuration of the LED driving circuit 10 shown in FIG. 1 may be a partial configuration thereof.

A capacitor C1 is connected to a pin P1 of the LED driving circuit 10, and a voltage VDD charged at the capacitor C1 is supplied to the LED driving circuit 10. The voltage VDD is a source voltage required for an operation of the LED driving circuit 10. The capacitor C1 is charged by the input voltage Vin so that the voltage VDD may be generated.

The dimming signal DIM may be input through a pin P2, the voltage VS may be input through the pin P3, the gate voltage VG may be output through a pin P4, and the input voltage Vin may be supplied through a pin P5.

The reference voltage generator 13 may be biased by the voltage VDD, may receive the dimming signal DIM, and may generate the high limit reference voltage RH and the low limit reference voltage RL. Each of the high limit reference voltage RH and the low limit reference voltage RL may be a constant value, but the present disclosure is not limited thereto.

The reference voltage generator 13 may generate a high limit dimming signal having a level higher than that of the dimming signal DIM by a first level and a low limit dimming signal having a level lower than that of the dimming signal DIM by a second level, and then may generate the high limit reference voltage RH and the low limit reference voltage RL on the basis of the high limit dimming signal and the low limit dimming signal, respectively. At this point, when the level of the dimming signal DIM is less than a predetermined critical value, the first and second levels may be determined according to the dimming signal DIM. The predetermined critical value may be the frequency modulation reference voltage DPFMR.

The reference voltage generator 13 may generate the frequency modulation reference voltage DPFMR and supply the generated frequency modulation reference voltage DPFMR to the switching controller 11. The reference voltage generator 13 may generate the frequency modulation reference voltage DPFMR with a predetermined ratio of a level when the dimming signal DIM is indicative of maximum brightness.

When a level of the dimming signal DIM is lower than that of the frequency modulation reference voltage DPFMR, a switching frequency of the power switch 5 may be varied according to the dimming signal DIM. For example, the switching frequency is decreased as the dimming signal DIM is decreased. On the other hand, when the level of the dimming signal DIM is higher than that of the frequency modulation reference voltage DPFMR, the switching frequency of the power switch 5 may be steady.

The switching controller 11 generates the sensing voltage VSENSE by subtracting the voltage VS from the input voltage Vin, and controls a switching operation of the power switch 5 on the basis of comparison results between the sensing voltage VSENSE and each of the high limit reference voltage RH and the low limit reference voltage RL, and between the level of the compensation dimming signal DIMS and that of the frequency modulation reference voltage DPFMR. Since the voltage VS is Vin−(IL*RS), when the voltage VS is subtracted from the input voltage Vin, IL*RS, that is, the sensing voltage VSENSE depending on the current flowing at the LED string 4 may be generated.

When the level of the dimming signal DIM is higher than that of the frequency modulation reference voltage DPFMR, the comparison result between the level of the compensation dimming signal DIMS and that of the frequency modulation reference voltage DPFMR may not be influential in the switching operation of the power switch 5. When the level of the dimming signal DIM is lower than that of the frequency modulation reference voltage DPFMR, the switching controller 11 may generate the compensation dimming signal DIMS so as to control a turn-on time of the power switch 5 according to the level of the dimming signal DIM. Therefore, as the level of the dimming signal DIM is decreased, a period from a turn-off time of the power switch 5 to a next turn-on time thereof may be prolonged.

The gate driving circuit 12 generates the gate voltage VG according to a gate control signal PWM_D. For example, during a period in which the gate control signal PWM_D is a high level, the gate driving circuit 12 generates the gate voltage VG of a high level which turns on the power switch 5. During a period in which the gate control signal PWM_D is a low level, the gate driving circuit 12 generates the gate voltage VG of a low level which turns off the power switch 5.

Hereinafter, referring to FIGS. 2 and 3, the switching controller 11 will be described.

Figure 2:
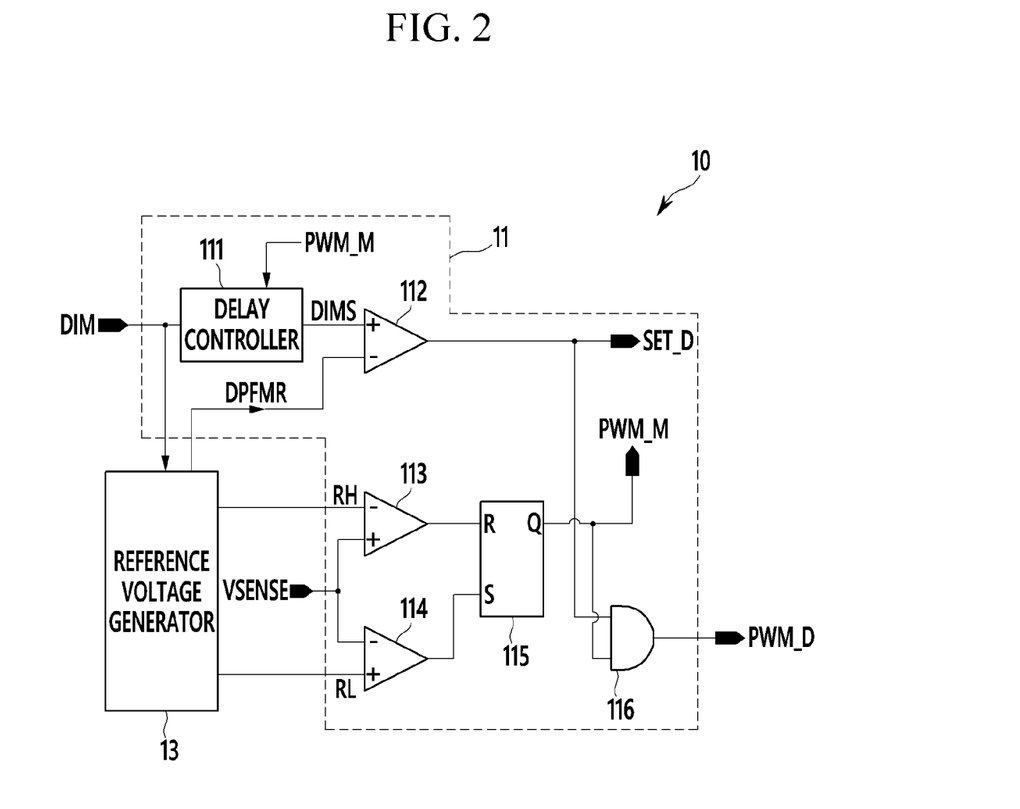
FIG. 2 is a diagram illustrating a configuration of a switching controller according to an embodiment.

FIG. 2 is a diagram illustrating a configuration of the switching controller 11 according to an embodiment.

As shown in FIG. 2, the switching controller 11 includes a delay controller 111, three comparators 112, 113, and 114, a set-reset (SR) flip-flop 115, and a logical operator 116.

Each of the three comparators 112, 113, and 114 may generate an output of a high level when an input level of a non-inverting terminal (+) is equal to or greater than that of an inverting terminal (−), whereas it may generate an output of a low level when the input level of the non-inverting terminal (+) is less than that of the inverting terminal (−).

The delay controller 111 receives a modulation control signal PWM_M, and generates the compensation dimming signal DIMS by adding a compensation signal, which is generated according to the modulation control signal PWM_M, to the dimming signal DIM. For example, the delay controller 111 may generate a compensation signal VSAW, which is being increased during a period from a time when the sensing voltage VSENSE reaches the low limit reference voltage RL to a time when the sensing voltage VSENSE reaches the high limit reference voltage RH, according to the modulation control signal PWM_M.

The comparator 112 generates a frequency control signal SET_D on the basis of a comparison result between a level of the frequency modulation reference voltage DPFMR and that of the compensation dimming signal DIMS. The frequency modulation reference voltage DPFMR is input to the inverting terminal (−) of the comparator 112, and the compensation dimming signal DIMS is input to the non-inverting terminal (+) of the comparator 112. Consequently, the comparator 112 may generate the frequency control signal SET_D of a high level when the level of the compensation dimming signal DIMS is equal to or greater than that of the frequency modulation reference voltage DPFMR, whereas it may generate the frequency control signal SET_D of a low level when the level of the compensation dimming signal DIMS is less than that of the frequency modulation reference voltage DPFMR.

The comparator 113 generates an input of a reset terminal R of the SR flip-flop 115 on the basis of a comparison result between the sensing voltage VSENSE and the high limit reference voltage RH. The high limit reference voltage RH is input to the inverting terminal (−) of the comparator 113, and the sensing voltage VSENSE is input to the non-inverting terminal (+) of the comparator 113. Consequently, the comparator 113 outputs a high level when the sensing voltage VSENSE is equal to or greater than the high limit reference voltage RH, whereas it outputs a low level when the sensing voltage VSENSE is less than the high limit reference voltage RH.

The comparator 114 generates an input of a set terminal S of the SR flip-flop 115 on the basis of a comparison result between the sensing voltage VSENSE and the low limit reference voltage RL. The low limit reference voltage RL is input to the non-inverting terminal (+) of the comparator 114, and the sensing voltage VSENSE is input to the inverting terminal (−) of the comparator 114. Consequently, the comparator 114 outputs a high level when the low limit reference voltage RL is equal to or greater than the sensing voltage VSENSE, whereas it outputs a low level when the low limit reference voltage RL is less than the sensing voltage VSENSE.

The SR flip-flop 115 generates the modulation control signal PWM_M according to the inputs of the set terminal S and the reset terminal R. For example, the SR flip-flop 115 raises a level of the modulation control signal PWM_M to a high level in synchronization with a rising edge of the input of the set terminal S, whereas it drops the level of the modulation control signal PWM_M to a low level in synchronization with a rising edge of the input of the reset terminal R.

The logical operator 116 performs a logical operation on the modulation control signal PWM_M and the frequency control signal SET_D to generate the gate control signal PWM_D. The logical operator 116 according to the embodiment may be implemented with an AND gate which performs a logical AND operation, but the present disclosure is not limited thereto. The logical operator 116 may be implemented with other logic gate in consideration of a level according to a condition of each of the modulation control signal PWM_M and the frequency control signal SET_D.

Figure 3:
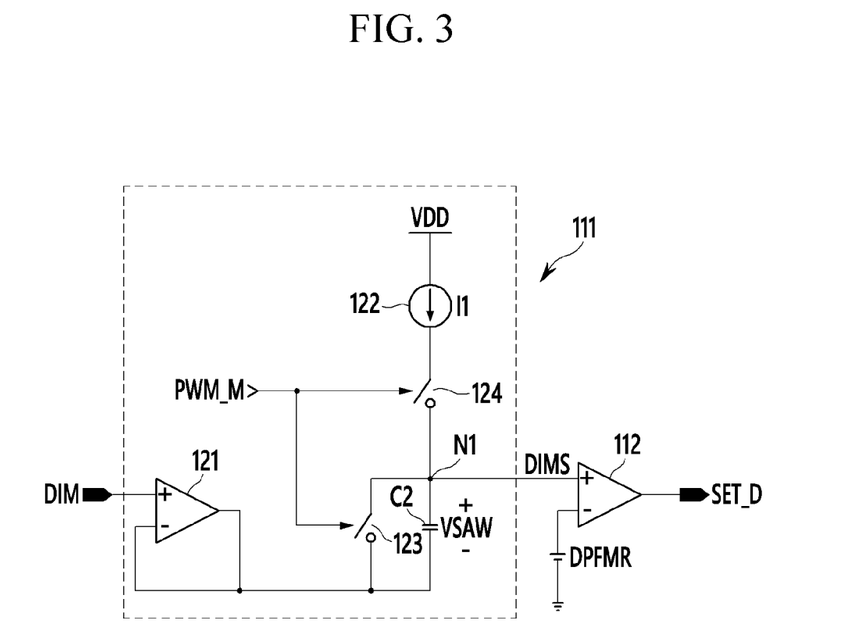
FIG. 3 is a diagram illustrating a configuration of a delay controller.

FIG. 3 is a diagram illustrating a configuration of the delay controller 111.

As shown in FIG. 3, the delay controller 111 includes an amplifier 121, a current source 122, two switches 123 and 124, and a capacitor C2.

An output terminal of the amplifier 121 and an inverting terminal (−) thereof are connected to each other, and the dimming signal DIM is input to a non-inverting terminal (+) of the amplifier 121. Therefore, the amplifier 121 outputs the dimming signal DIM.

The switch 123 is connected between the output terminal of the amplifier 121 and a node N1, and performs a switching operation according to the modulation control signal PWM_M. For example, the switch 123 may be turned off according to the modulation control signal PWM_M of a high level, and may be turned on according to the modulation control signal PWM_M of a low level.

The current source 122 generates a constant current I1 using the voltage VDD.

The switch 124 is connected between the current source 122 and the node N1, and performs a switching operation according to the modulation control signal PWM_M. For example, the switch 124 may be turned on according to the modulation control signal PWM_M of a high level, and may be turned off according to the modulation control signal PWM_M of a low level.

The capacitor C2 is connected between the output terminal of the amplifier 121 and the node N1.

When the switch 123 is in an ON state and the switch 124 is in an OFF state, a level of the compensation dimming signal DIMS is the same as that of the dimming signal DIM. On the other hand, when the switch 123 is in an OFF state and the switch 124 is in an ON state, the capacitor C2 is charged by the constant current I1 and thus a voltage at the node N1 is increased. Consequently, the compensation dimming signal DIMS has a level which is obtained by adding the compensation signal VSAW, which is a voltage across both ends of the capacitor C2, to the dimming signal DIM.

In the embodiment shown in FIG. 3, the switch 124 is connected between the current source 122 and the capacitor C2, but the present disclosure is not limited thereto. Alternatively, the current source 122 and the capacitor C2 may be directly connected to each other. Even in such a case, the voltage at the node N1 depends on the dimming signal DIM during a period in which the switch 123 is in the ON state.

Figure 4:
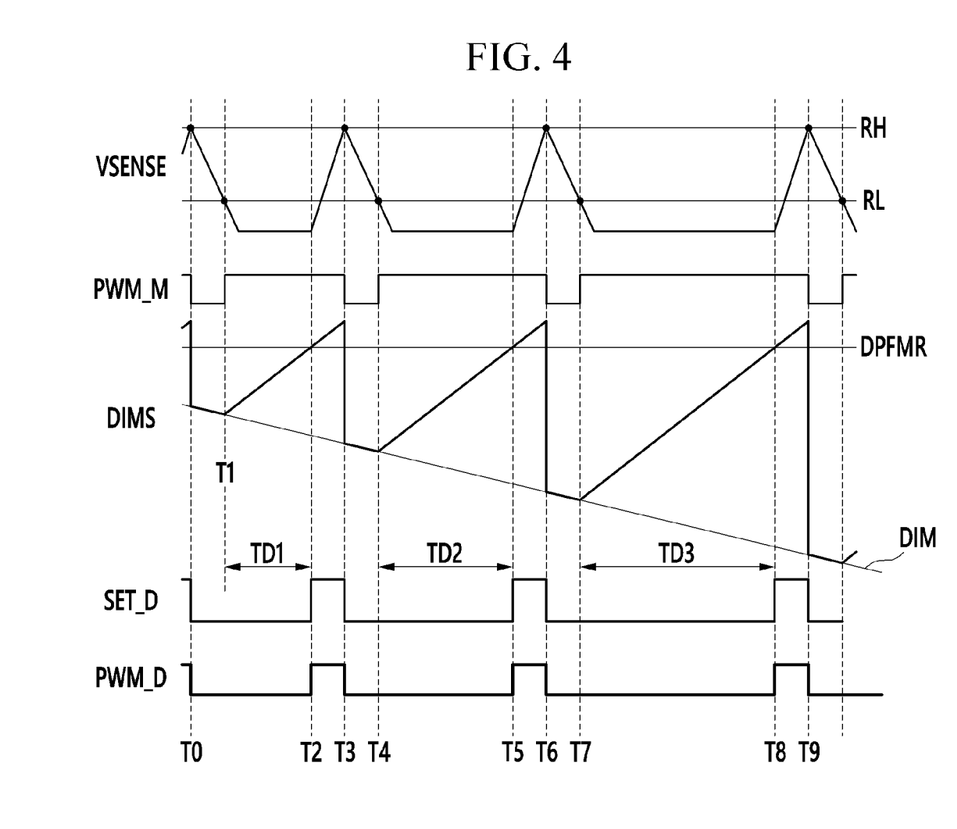
FIG. 4 is a waveform diagram illustrating signal waveforms according to the embodiment.

Referring to FIG. 4, an operation of the embodiment will be described.

FIG. 4 is a waveform diagram illustrating signal waveforms according to the embodiment.

FIG. 4 shows waveforms in which the level of the dimming signal DIM is lower than that of the frequency modulation reference voltage DPFMR and the dimming signal DIM is decreased. FIG. 4 is an example for describing an operation in which a delay period is increased as the dimming signal DIM is decreased such that a switching frequency is decreased, and the present disclosure is not limited thereto.

As shown in FIG. 4, when the sensing voltage VSENSE reaches the high limit reference voltage RH at a time T0, an output of the comparator 113 becomes a high level and thus the modulation control signal PWM_M falls to a low level and the gate control signal PWM_D also falls to a low level such that the power switch 5 is turned off.

At the time T0, the switch 124 is turned off according to the modulation control signal PWM_M and the switch 123 is turned on according to an inverted modulation control signal PWM_M such that a level of the compensation dimming signal DIMS becomes the same as that of the dimming signal DIM. At the time T0, the level of the compensation dimming signal DIMS is lower than that of the frequency modulation reference voltage DPFMR such that the frequency control signal SET_D falls to a low level.

When the sensing voltage VSENSE reaches the low limit reference voltage RL at a time T1, an output of the comparator 114 becomes a high level such that the modulation control signal PWM_M rises to a high level. The switch 124 is turned on according to the modulation control signal PWM_M and the switch 123 is turned off according to the inverted modulation control signal PWM_M such that the compensation dimming signal DIMS begins to be increased according to an addition of the compensation signal VSAW to the dimming signal DIM.

When the level of the compensation dimming signal DIMS reaches that of the frequency modulation reference voltage DPFMR at a time T2, the frequency control signal SET_D rises to a high level and also the gate control signal PWM_D rises to a high level such that the power switch 5 is turned on. There is a delay period TD1 between the time T1 and the time T2 at which the power switch 5 is turned on.

When the sensing voltage VSENSE reaches the high limit reference voltage RH at a time T3, the above described operations performed at the time T0 are repeated. When the sensing voltage VSENSE reaches the low limit reference voltage RL at a time T4, the above described operations performed at the time T1 are repeated.

When the level of the compensation dimming signal DIMS reaches that of the frequency modulation reference voltage DPFMR at a time T5, the frequency control signal SET_D rises to a high level and also the gate control signal PWM_D rises to a high level such that the power switch 5 is turned on. There is a delay period TD2 between the time T4 and the time T5 at which the power switch 5 is turned on. As the dimming signal DIM is decreased, a delay period is prolonged from the delay period TD1 to the delay period TD2.

When the sensing voltage VSENSE reaches the high limit reference voltage RH at a time T6, the above described operations performed at the time T0 are repeated. When the sensing voltage VSENSE reaches the low limit reference voltage RL at a time T7, the above described operations performed at the time T1 are repeated.

When the level of the compensation dimming signal DIMS reaches that of the frequency modulation reference voltage DPFMR at a time T8, the frequency control signal SET_D rises to a high level and also the gate control signal PWM_D rises to a high level such that the power switch 5 is turned on. There is a delay period TD3 between the time T7 and the time T8 at which the power switch 5 is turned on. As the dimming signal DIM is decreased, the delay period is prolonged from the delay period TD2 to the delay period TD3.

When the level of the dimming signal DIM is higher than that of the frequency modulation reference voltage DPFMR, the switching controller 11 may generate the gate control signal PWM_D on the basis of comparison results between the sensing voltage VSENSE and each of the high limit reference voltage RH and the low limit reference voltage RL.

In synchronization with a time at which the sensing voltage VSENSE reaches the high limit reference voltage RH, the switching controller 11 turns off the power switch 5. In synchronization with a time at which the sensing voltage VSENSE, which is being decreased by the turn-off operation of the power switch 5, reaches the low limit reference voltage RL, the switching controller 11 may turn on the power switch 5.

However, when the level of the dimming signal DIM is lower than that of the frequency modulation reference voltage DPFMR, the switching controller 11 turns on the power switch 5 after the delay periods TD1, TD2, and TD3 from the time at which the sensing voltage VSENSE reaches the low limit reference voltage RL. The delay period is increased as the dimming signal DIM is decreased and thus a switching frequency is reduced such that brightness of the LED string 4 is reduced.

In accordance with the embodiments, when low brightness is required, an LED string may precisely emit a small amount of light according to a dimming signal.

Although the present disclosure has been described by way of a plurality of embodiments, the scope of the present disclosure is not limited thereto, and numerous alterations and modifications, which can be devised by those skilled in the art using the fundamental concept of the present disclosure defined by the appended claims, will also fall within the scope of this disclosure.

What is claimed is:

1. A light emitting diode (LED) driving circuit for controlling a switching operation of a power switch connected to an LED string, comprising:
   a reference voltage generator configured to generate a frequency modulation reference voltage according to a dimming signal that controls brightness of the LED string; and
   a switching controller configured to control a switching frequency of the power switch to be constant when a level of the dimming signal is higher than that of the frequency modulation reference voltage, and vary the switching frequency of the power switch based on the dimming signal when a level of the dimming signal is lower than that of the frequency modulation reference voltage.

2. The LED driving circuit of claim 1, wherein the switching controller is configured to generate a compensation dimming signal so as to control a delay period according to the dimming signal, and control a turn-on time of the power switch on the basis of a comparison result between a level of the compensation dimming signal and that of the frequency modulation reference voltage when a level of the dimming signal is lower than that of the frequency modulation reference voltage.

3. The LED driving circuit of claim 2, wherein the reference voltage generator is configured to generate an upper limit reference voltage and a lower limit reference voltage, and
   the switching controller generates a modulation control signal on the basis of comparison results between a sensing voltage, which corresponds to a current flowing at the LED string, and each of the upper limit reference voltage and the lower limit reference voltage, and the compensation dimming signal by adding a compensation signal, which is generated according to the modulation control signal, to the dimming signal.

4. The LED driving circuit of claim 3, wherein the switching controller includes:
   a first comparator configured to compare the sensing voltage with the upper limit reference voltage;
   a second comparator configured to compare the sensing voltage with the lower limit reference voltage; and
   a set-reset (SR) flip-flop configured to generate the modulation control signal according to outputs of the first comparator and the second comparator.

5. The LED driving circuit of claim 3, wherein the switching controller includes a delay controller configured to generate the compensation signal, which is being increased during a period from a time at which the sensing voltage reaches the lower limit reference voltage to a time at which the sensing voltage reaches the upper limit reference voltage, according to the modulation control signal, and the compensation dimming signal by adding the compensation signal and the dimming signal.

6. The LED driving circuit of claim 5, wherein the delay controller includes:
   a current source;
   an amplifier including a first input terminal to which the dimming signal is input, a second input terminal, and an output terminal connected to the second input terminal;
   a first switch connected between the output terminal of the amplifier and a first node, and configured to perform a switching operation according to the modulation control signal; and
   a capacitor connected between the first node and the output terminal of the amplifier,
   wherein the compensation dimming signal depends on a voltage at the first node.

7. The LED driving circuit of claim 6, wherein the delay controller further includes a second switch connected between the current source and the first node, and configured to perform a switching operation according to the modulation control signal.

8. The LED driving circuit of claim 3, wherein the switching controller includes:
a comparator configured to compare the compensation dimming signal with the frequency modulation reference voltage, thereby generating a frequency control signal, and
a logical operator configured to perform a logical operation on the frequency control signal and the modulation control signal, thereby generating a gate control signal.

9. A light emitting diode (LED) device comprising:
an LED string;
a power switch electrically connected to the LED string, and configured to control a current flowing at the LED string; and
an LED driving circuit configured to generate a frequency modulation reference voltage according to a dimming signal that controls brightness of the LED string, generate a compensation dimming signal so as to control a delay period according to the dimming signal, and vary a switching frequency of the power switch on the basis of a comparison result between a level of the compensation dimming signal and that of the frequency modulation reference voltage when a level of the dimming signal is lower than that of the frequency modulation reference voltage.

10. The LED device of claim 9, wherein the LED driving circuit includes:
a reference voltage generator configured to generate an upper limit reference voltage, a lower limit reference voltage, and the frequency modulation reference voltage according to the dimming signal; and
a switching controller configured to generate a compensation dimming signal by adding a compensation signal to the dimming signal, and control a turn-on time of the power switch in synchronization with a time at which a level of the compensation dimming signal reaches the level of the frequency modulation reference voltage when the level of the dimming signal is lower than the level of the frequency modulation reference voltage.

11. The LED device of claim 10, wherein the switching controller generates a modulation control signal on the basis of comparison results between a sensing voltage, which corresponds to the current flowing at the LED string, and each of the upper limit reference voltage and the lower limit reference voltage, and generates the compensation signal that is generated according to the modulation control signal.

12. The LED device of claim 11, wherein the switching controller includes:
a first comparator configured to compare the sensing voltage with the upper limit reference voltage;
a second comparator configured to compare the sensing voltage with the lower limit reference voltage; and
a set-reset (SR) flip-flop configured to generate the modulation control signal according to outputs of the first comparator and the second comparator.

13. The LED device of claim 11, wherein the switching controller includes a delay controller configured to generate the compensation signal, which is being increased during a period from a time at which the sensing voltage reaches the lower limit reference voltage to a time at which the sensing voltage reaches the upper limit reference voltage, according to the modulation control signal, and the compensation dimming signal by adding the compensation signal and the dimming signal.

14. The LED device of claim 13, wherein the delay controller includes:
a current source;
an amplifier including a first input terminal to which the dimming signal is input, a second input terminal, and an output terminal connected to the second input terminal;
a first switch connected between the output terminal of the amplifier and a first node, and configured to perform a switching operation according to the modulation control signal; and
a capacitor connected between the first node and the output terminal of the amplifier,
wherein the compensation dimming signal depends on a voltage at the first node.

15. The LED device of claim 14, wherein the delay controller further includes a second switch connected between the current source and the first node, and configured to perform a switching operation according to the modulation control signal.

16. The LED device of claim 11, wherein the switching controller includes a comparator configured to compare the compensation dimming signal with the frequency modulation reference voltage, thereby generating a frequency control signal.

17. The LED device of claim 16, wherein the switching controller includes a logical operator configured to perform a logical operation on the frequency control signal and the modulation control signal, thereby generating a gate control signal.

18. A light emitting diode (LED) driving method for controlling a switching operation of a power switch connected to an LED string, comprising:
generating an upper limit reference voltage, a lower limit reference voltage, and a frequency modulation reference voltage according to a dimming signal that controls brightness of the LED string;
generating a compensation dimming signal so as to control a delay period according to the dimming signal; and
varying a switching frequency of the power switch on the basis of a comparison result between a level of the compensation dimming signal and that of the frequency modulation reference voltage when a level of the dimming signal is lower than that of the frequency modulation reference voltage.

19. The LED driving method of claim 18, further comprising:
controlling a turn-on time of the power switch on the basis of a comparison result between a sensing voltage, which corresponds to a current flowing at the LED string, and the upper limit reference voltage.

20. The LED driving method of claim 18, wherein the generating of the compensation dimming signal includes:
generating a compensation signal that is being increased during a period from a time at which the sensing voltage, which corresponds to the current flowing at the LED string, reaches the lower limit reference voltage to a time at which the sensing voltage reaches the upper limit reference voltage; and
adding the compensation signal to the dimming signal.

* * * * *